(12) United States Patent
Ueta (10) Patent No.: US 11,153,131 B2
(45) Date of Patent: Oct. 19, 2021

(54) COMMUNICATION SYSTEM, CONTROL CIRCUIT, AND RECEIVED SIGNAL ADJUSTMENT METHOD OF EQUIPMENT

(71) Applicant: RENESAS ELECTRONICS CORPORATION, Tokyo (JP)

(72) Inventor: Kouji Ueta, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/854,443

(22) Filed: Apr. 21, 2020

(65) Prior Publication Data

US 2020/0412585 A1 Dec. 31, 2020

(30) Foreign Application Priority Data

Jun. 26, 2019 (JP) .............................. JP2019-118193

(51) Int. Cl.
*H04L 25/03* (2006.01)
*H04B 3/04* (2006.01)

(52) U.S. Cl.
CPC ......... *H04L 25/03057* (2013.01); *H04B 3/04* (2013.01); *H04L 25/03343* (2013.01); *H04L 25/03885* (2013.01)

(58) Field of Classification Search
CPC ......... H04L 25/03057; H04L 25/03343; H04L 25/03885; H04B 3/04
See application file for complete search history.

(56) References Cited

U.S. PATENT DOCUMENTS

| 8,483,263 | B2 | 7/2013 | Aoki | |
|---|---|---|---|---|
| 2002/0097793 | A1* | 7/2002 | Struhsaker | H01Q 1/246 375/222 |
| 2010/0235546 | A1* | 9/2010 | Terlizzi | G06F 13/385 710/16 |
| 2018/0288208 | A1* | 10/2018 | Lee | H04M 1/72575 |

FOREIGN PATENT DOCUMENTS

JP 2011-130093 A 6/2011

* cited by examiner

*Primary Examiner* — David S Huang
(74) *Attorney, Agent, or Firm* — McDermott Will & Emery LLP (57) ABSTRACT

Increase the effective data rate of high-speed data communication. It has a memory unit, a reception signal line, and a transmission signal line capable of communicating with an external device via a control circuit and an equalizer, controllers for controlling transmission and reception of signals to and from the external device, and a correction coefficient associated with an identification information and the identification information of the external device. The control circuit sets the correction coefficient associated with the identification information to the equalizer.

10 Claims, 7 Drawing Sheets

COMMUNICATION SYSTEM, CONTROL CIRCUIT, AND RECEIVED SIGNAL ADJUSTMENT METHOD OF EQUIPMENT

CROSS-REFERENCE TO RELATED APPLICATIONS

The disclosure of Japanese Patent Application No. 2019-118193 filed on Jun. 26, 2019 including the specification, drawings and abstract is incorporated herein by reference in its entirety.

BACKGROUND

The present disclosure relates to a communication system, a control circuit, and an equalizer received signal conditioning method, for example, the communication system, a control circuit, and an equalizer received signal conditioning method for high-speed data communication.

There are disclosed techniques listed below.

[Patent Document 1] Japanese Unexamined Patent Application Publication No. 2011-130093

USB (Universal Serial Bus) is known as communication for transmitting serial data at high speed. The above-mentioned communication is often used for data communication between a host equipment and an external device (such as a device equipment) (for example, see Patent Document 1).

SUMMARY

In such high-speed serial communication, degradation of the signal quality due to losses in the transmission path such as a cable and wiring has become a problem. In recent years, with an increase in communication speed, it has become difficult to design a device that processes high-speed data communication. If the cable or appliance used for high-speed data communication is not designed to increase the communication speed, reflections or losses due to impedance mismatch of the transmission path occur, the communication signal is deteriorated. Accordingly, since it becomes susceptible to noise during communication, a situation occurs in which the signal cannot be received correctly, an effective data rate is lowered event has occurred.

Other objects and novel features will become apparent from the description of this specification and the accompanying drawings.

Accordingly to one embodiment, a communication system communicating with an external device via transmission signal lines and reception signal lines, comprises a memory unit capable of storing an identification information of the external device and a correction coefficient associated with the identification information; an equalizer being set the correction coefficient, and operating; and a control unit setting the correction coefficient stored in the memory unit to the equalizer.

In addition, accordingly to one embodiment, a control circuit receiving an identification information from external performing an authentication process, searching a correction coefficient associated with the identification information and setting the correction coefficient.

In addition, accordingly to one embodiment, an equalizer adjusting received signals method, comprising: searching an identification information of an external device coupled to external and a correction coefficient associated with the identification information; setting the correction coefficient associated with the identification information of the external device to the equalizer; and selecting a correction coefficient by receiving test signals based on set the correction coefficient, repeatedly changing the correction coefficient of the equalizer and receiving the test signals.

According to an embodiment of the communication system, the effective data rate is increased when a previously connected the external device is reconnected.

DETAILED DESCRIPTION

In the following embodiments, when required for convenience, the description will be made by dividing into a plurality of sections or embodiments, but except when specifically stated, they are not independent of each other, and one is related to the modified example, detail, supplementary description, or the like of part or all of the other. In the following embodiments, the number of elements, etc. (including the number of elements, numerical values, quantities, ranges, etc.) is not limited to the specific number, but may be not less than or equal to the specific number, except for cases where the number is specifically indicated and is clearly limited to the specific number in principle. Furthermore, in the following embodiments, it is needless to say that the constituent elements (including element steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above numerical values and ranges.

Hereinafter, embodiments will be described in detail based on the drawings. In all the drawings for explaining the embodiments, members having the same functions are denoted by the same reference numerals, and repetitive descriptions thereof are omitted. In the following embodiments, descriptions of the same or similar parts will not be repeated in principle except when particularly necessary.

First Embodiment

Figure 1:
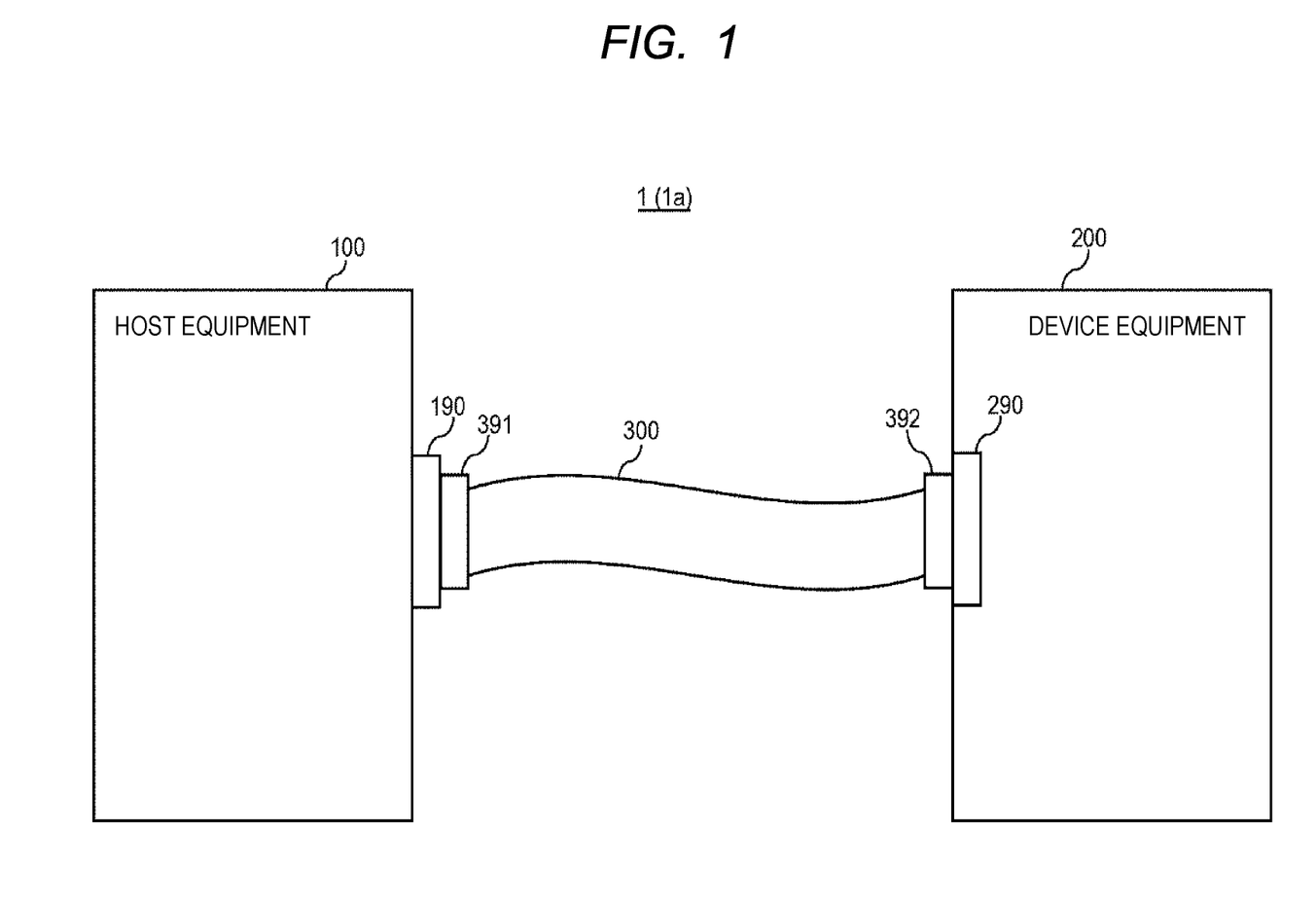
FIG. 1 is a block diagram showing an exemplary configuration of a transceiver system related to first and second embodiments.

A first embodiment will be explained. FIG. 1 is a block diagram showing an exemplary configuration of the transceiver system related to the first and second embodiments. As shown in FIG. 1, the transceiver system 1 includes a host equipment 100, a device equipment 200, and a cable 300. The host equipment 100 and the device equipment 200 are a communication system. The cable 300 connects the host equipment 100 and the device equipment 200.

The host equipment 100 is connected to the device equipment 200 as an external device via the cable 300. The host equipment 100 and the device equipment 200 include receptacles 190 and 290, respectively. The cable 300 includes plugs 391, 392 connected to the receptacles 190, 290 of the host equipment 100 and the device equipment 200 at both ends thereof. Here, the cable 300 is connected to the receptacles 190, 290 of the communication system via the plugs 391, 392, but the embodiment is not limited thereto. For example, depending on the form of the device equipment 200, the cable 300 may not be used, and the host equipment 100 and device equipment 200 may be directly connected to each other via the receptacle 190 or 290. The host equipment 100 is also referred to as a host device or a USB host. The device equipment 200 is also referred to as a USB device.

Figure 2:
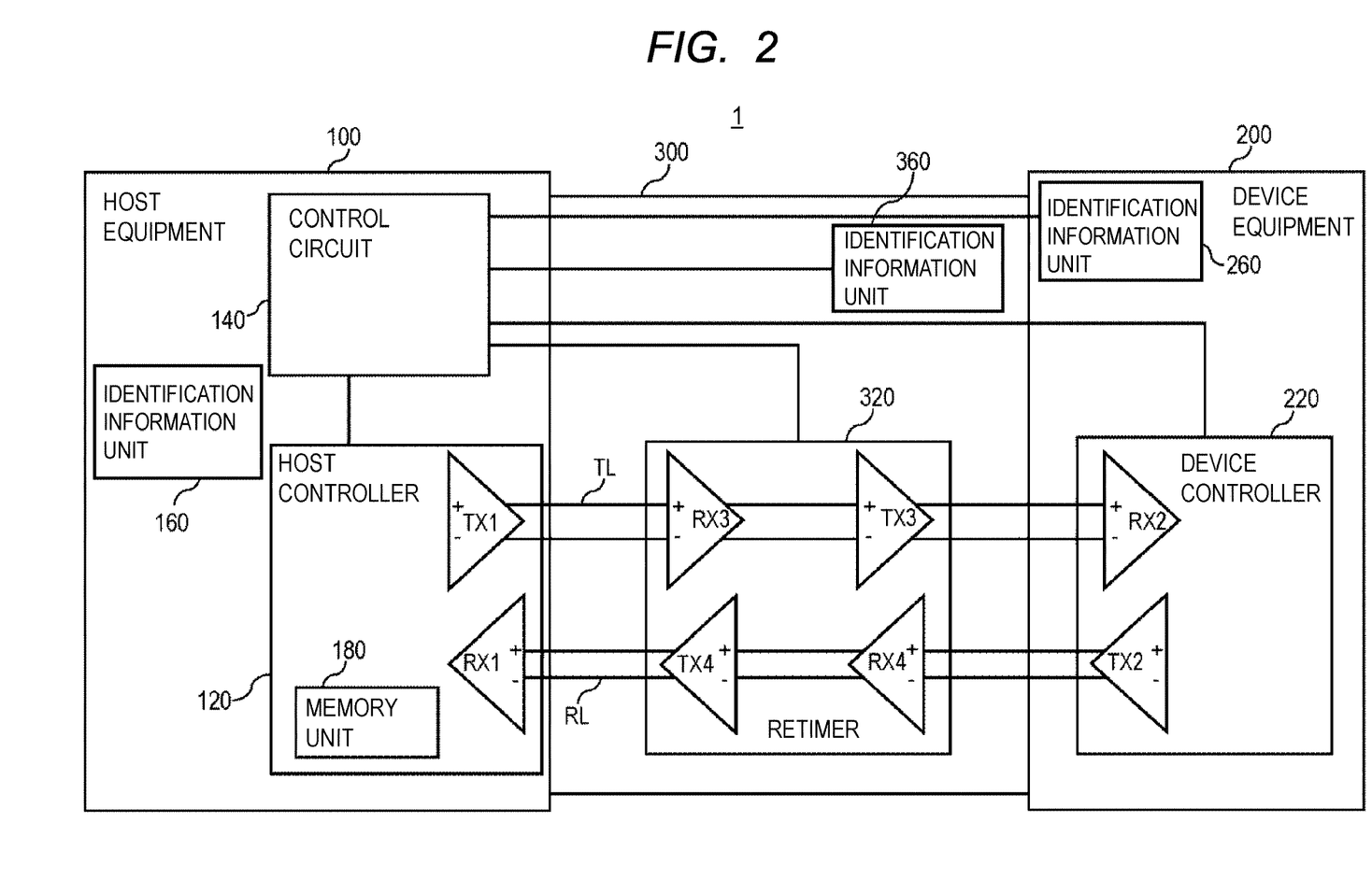
FIG. 2 is a block diagram showing an exemplary internal configuration of the transceiver system related to the first embodiment.

FIG. 2 is a block diagram showing an exemplary internal configuration of the transceiver system related to the first embodiment. The transceiver system 1 includes the host equipment 100, the device equipment 200, and the cable 300 connected to the host equipment 100 and the device equipment 200. For example, as shown in FIG. 1, the host equipment 100 and the device equipment 200 are connected to each other through the cable 300 including the plugs 391 and 392 and the receptacles 190 and 290.

The host equipment 100 includes a control circuit 140, an identification information unit 160, and a host controller 120. The host equipment 100 controls entire transceiver system 1 including the device equipment 200 and the cable 300. The communication system (host equipment 100) can communicate with the external device (device equipment 200) via reception signal lines RL and transmission signal lines TL.

The control circuit 140 is connected to an identification information unit 260 of the device equipment 200 and an identification information unit 360 of the cable 300. The control circuit 140 controls the host controller 120 to retrieve a correction coefficient associated with an identification information based on the identification information stored in the identification information unit 260 of the device equipment 200 and the identification information stored in the identification information unit 360 of the cable 300. If there is the correction coefficient associated with the identification information, the control circuit 140 sets the correction coefficient as a training start coefficient. In addition, the control circuit 140 sets the above correction coefficient to the host controller 120. The control circuit 140 instructs the host controller 120 to control reception units RX (RX1, RX2, RX3, RX4).

The identification information unit 160 is composed of memories storing an identification information for identifying the individual of the host equipment 100. For example, the identification information is a serial number assigned at a time of manufacturing the host equipment, the control circuit 140, or the like. The identification information unit 160 may be included in the control circuit 140 or the host controller 120.

The host controller 120 includes a memory unit 180, a reception unit RX1, and a transmission unit TX1. The host controller 120 performs data communication with the device equipment 200 via the transmission signal lines TL and the reception signal lines RL. The host controller 120 executes a training sequence each time which the host equipment 100 and the device equipment 200 are connected via the cable 300. The training sequence will be described in detail later. The host controller 120 and the control circuit 140 are the control unit for controlling transmission and reception operations between the device equipment 200 and the cable 300.

The memory unit 180 stores predetermined data for use by the host controller 120. The memory unit 180 stores the values of the correction coefficient associated with the identification information of the device equipment 200 and the identification information of the device equipment 200 in association with each other. In addition, the memory unit 180 stores the identification information of the cable 300 and values of the correction coefficient associated with the identification information of the cable 300 in association with each other. Examples of the memory unit 180 include memory and registers. The memory unit 180 can store the identification information of the external device (device equipment 200) and the correction coefficient associated with the identification information.

The reception unit RX1 receives the high-speed serial signals transmitted from a transmission unit TX4 via the reception signal lines RL.

The transmission unit TX1 transmits high-speed serial signals to a reception unit RX3 via the transmission signal lines TL.

The device equipment 200 includes the identification information unit 260 and a device controller 220. The device equipment 200 performs data communication with the host equipment 100.

The identification information unit 260 is composed of memory storing an identification information for identifying the individual of the device equipment 200. For example, the identification information is a serial number assigned to the device equipment 200 at the time of manufacturing or the like, or an authentication data for connecting to an authorized product, or the like. The identification information stored in the identification information unit 260 is transmitted to the control circuit 140 of the host equipment 100 via the cable 300.

The device controller 220 includes a reception unit RX2 and a transmission unit TX2. The device controller 220 can perform data communication with the host equipment 100 via the transmission signal lines TL and the reception signal line RL. The device controller 220 is connected to control circuit 140 of the host equipment 100 via the cable 300.

The reception unit RX2 of the device controller 220 receives serial data from the host equipment 100 via the transmission signal lines TL.

The transmission unit TX2 of the device controller 220 transmits serial data to the host equipment 100 via the reception signal lines RL.

The cable 300 includes the identification information unit 360, a retimer 320, the transmission signal lines TL, and the reception signal lines RL.

The identification information unit 360 is composed of a memory storing an identification information for identifying the individual of the cable 300. For example, the identification information is a serial number assigned at the time of manufacturing or the like of the cable 300, or the authentication data for connecting to the authorized product, or the like. The identification information stored in the identification information unit 360 is transmitted to the control circuit 140 of the host equipment 100.

The retimer 320 has a plurality of reception units RX (RX3, RX4) and a plurality transmission units TX (TX3, TX4). Inside the retimer 320, the data from the transmission unit TX1 received by the reception unit RX3 is passed to the transmission unit TX3. The data received by the transmission unit TX3 is transmitted to the reception unit RX2. The data from the transmission unit TX2 received by the reception unit RX4 is passed to the transmission unit TX4. The data received by the transmission unit TX4 is transmitted to the reception unit RX1. The retimer 320 is connected to the control circuit 140 of the host equipment 100. The retimer 320 receives control signals transmitted from the control circuit 140.

The reception unit RX3 of the retimer 320 receives serial data from the transmission unit TX1 via the transmission signal lines TL. The data is passed to the transmission unit TX3 of the retimer 320. The reception unit RX4 of the retimer 320 receives serial data from the transmission unit TX2 via the reception signal lines RL. The data is passed to the transmission unit TX4 of the retimer 320.

The transmission unit TX3 of the retimer 320 transmits the data received from the reception unit RX3 of retimer 320 to the reception unit RX2 via the transmission signal lines TL. The transmission unit TX4 of the retimer 320 transmits the data received from the reception unit RX4 of retimer 320 to the reception unit RX1 via the reception signal lines RL.

The transmission signal lines TL transmits serial data signals transmitted from the transmission unit TX1 of the host equipment 100 to the device equipment 200.

The reception signal lines RL transmit serial data signals transmitted from the transmission unit TX2 of the device equipment 200 to the host equipment 100. The transmission signal lines TL and the reception signal lines RL, for example, a pair of differential signal lines. Furthermore, the transmission signal lines TL and the reception signal lines RL may be one pair or more differential signal lines.

Figure 3:
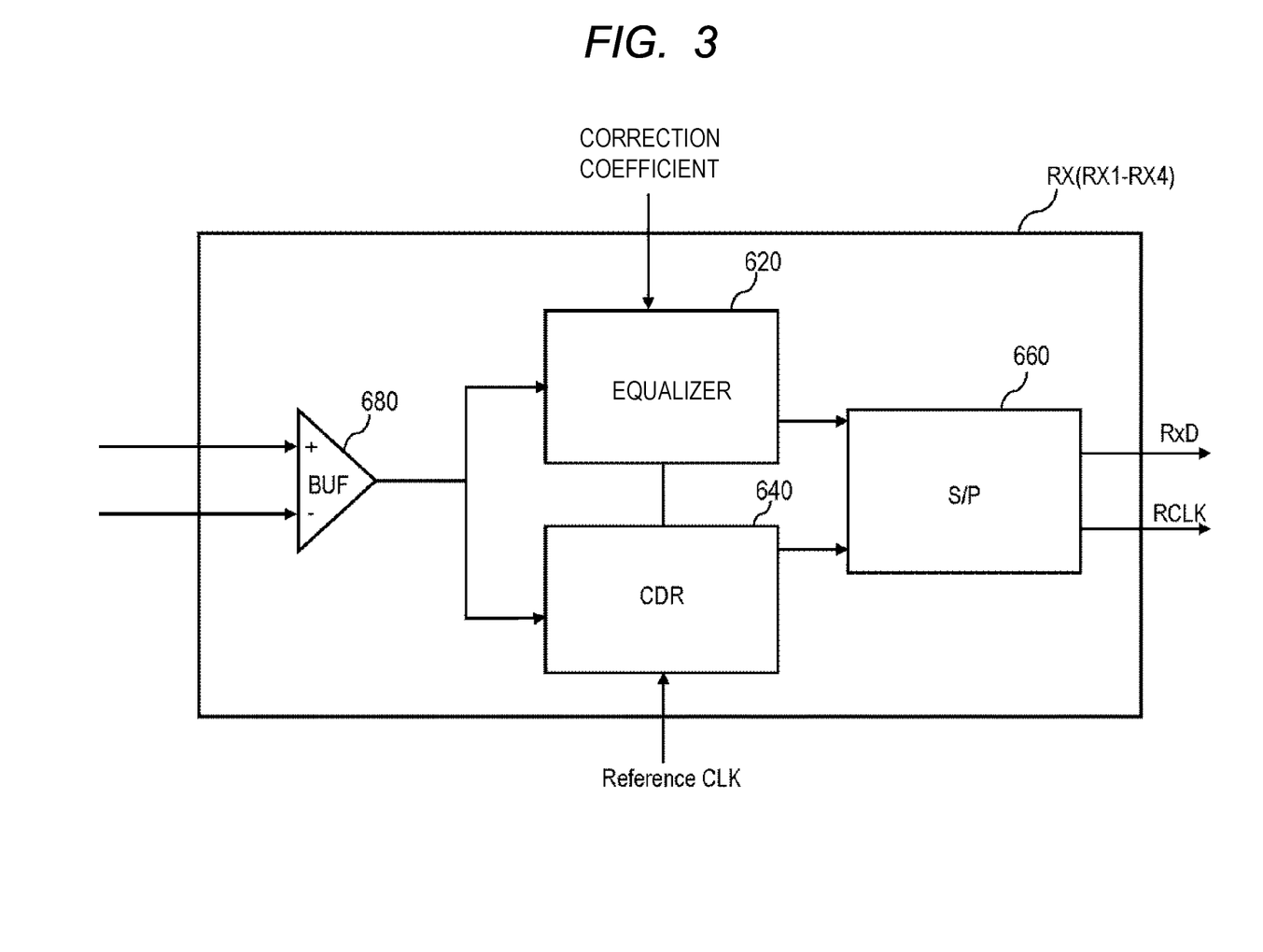
FIG. 3 is a block diagram showing an exemplary internal configuration of a reception unit related to the first embodiment.

FIG. 3 is a block diagram showing an exemplary internal configuration of the reception unit RX related to the first embodiment.

The reception unit RX shown in FIG. 3 corresponds to the circuit configuration of each of the reception units RX1, RX2, RX3, RX4. The reception unit RX includes a buffer (BUF) 680, a clock and data recovery circuit (CDR) 640, the equalizer 620, and a serial-to-parallel converter (S/P) 660.

The buffer 680 receives differential signals from the transmission signal lines TL and the reception signal lines RL, and outputs serial data to the equalizer 620 and the clock and data recovery circuit 640.

The clock and data recovery circuit 640 recovers clock signals from the serial data received from the buffer 680.

The equalizer 620 recovers the received data from the serial data using clocking signals recovered by the clock and data recovery circuit 640. The equalizer 620 is a compensation circuit that adjusts the waveform by frequency filtering or the like to optimize the frequency characteristics of the received signal. If the memory unit 180 stores the identification information of the device equipment 200 and the identification information of the cable 300 and values of the correction coefficient associated with each identification information above, the equalizer 620 is sets the above the correction coefficient by the control circuit 140. If the memory unit 180 does not store the identification information of the device equipment 200, the identification information of the cable 300 and values of the correction coefficient associated with each identification information above, the equalizer 620 is set a predetermined initial value as the correction coefficient by the host controller 120. The equalizer 620 operates based on the set correction coefficient. In addition, the equalizer 620 executes the training sequence by the host controller 120. A predetermined initial value is stored, for example, in a memory included in the host equipment 100.

A serial-to-parallel converter 660 converts the received data reproduced by the equalizer 620 into a parallel signal and generates a data signal RxD of parallel signal of a plurality of bits and a received clock RCLK.

The training sequence is described below.

Under the control of the host controller 120, when the training sequence is started, the reception unit RX1 receives the testing signals outputted from the transmission unit TX4. The host controller 120 performs control to create an Eye diagram of signals received by the reception unit RX1. The Eye diagram is a superimposed representation of a plurality of signal waveforms received. If the quality of the signal is good, since the waveform of the same shape overlaps, the opening of the Eye is an open state. Further, if the quality of the signal is poor, since the shifted waveform overlaps, the opening of the Eye becomes a narrow state.

Each equalizer 620 of the reception units RX (RX1, RX2, RX3, RX4) repeatedly changes the set the correction coefficient and receives the test signals. The host controller 120 performs control to create the Eye diagram each time the correction coefficient is changed to receive the test signals. Changing the correction coefficient adjusts the amplitude of the received signals and changes the size of the Eye opening.

The host controller 120 selects, from among the plurality of created the Eye diagrams, the correction coefficient with the opening of the Eye being the most opened, as the correction coefficient of the equalizer 620 for normal operation. If the opening of the Eye diagram is large, reception characteristics become good, and it becomes possible to receive the signal stably.

The correction coefficient of each the equalizer 620 has many possible values for a wide range of corrections. The host controller 120 performs the training sequence by changing the values of the correction coefficient while checking the sizes of the openings.

The amount of time to run the training sequence is limited to not wait for users. For example, USB3.2 standard specifies 360 msec. However, due to this time-limit, the host controller 120 cannot perform the creation of the Eye diagrams of all correction coefficient prepared in advance. Therefore, the host controller 120 selects the correction coefficient with a large opening from the state Eye diagram of a part of the correction coefficient. Since the correction coefficient is selected from among some of the executed correction coefficient, the correction coefficient with a smaller opening may be selected compared to an unexecuted correction coefficient.

If the correction coefficient with a small opening is selected, it is more susceptible to noise due to uncertain factors such as power supply noise and temperature changes during normal operation. Since the opening of the Eye is reduced by the noise, an event that cannot correctly judge the signal occurs. This is a receive error, and if the receive error occurs, the training sequence is executed again, resulting in a degradation in the effective data rate.

In this first embodiment, in order to reduce the occurrence of the above-mentioned reception errors, a process of searching for the identification information is performed prior to the start of the training sequence.

Prior to the training sequence, the control circuit 140 searches the memory unit 180 for stored combination of the identification information and the correction coefficient which is the last correction data related to combination of the identification information above. The combination of the identification information is combination of the identification information unit 260 of the device equipment 200 and the identification information stored in the identification information unit 360 of the cable 300 connected this time.

If the memory unit 180 stores the combination of identification information of the device equipment 200 and the identification information of the cable 300, the control circuit 140 sets the last correction coefficient stored associated with the identification information as the training start coefficient to each equalizer 620 of the reception units RX (RX1, RX2, RX3, RX4). If the memory unit 180 does not store the combination of the identification information of the device equipment 200 and the identification information of the cable 300, the host controller 120 sets the initial value previously stored in the host equipment 100 or the like as the training start coefficient in each equalizer 620 of the reception units RX (RX1, RX2, RX3, RX4). The host controller 120 starts the training sequence based on the last correction coefficient or the correction coefficient of a predetermined initial value.

The host controller 120 performs the training sequence that adjusts the amplitude of the received signal by adjusting the correction coefficient of each equalizer 620 of the reception units RX (RX1, RX2, RX3, RX4). The correction coefficient stored in the memory unit 180 is not limited to the value selected at the time of the last connection, but may be a value selected at the time of before previous connection.

Upon completion of the training sequence, the correction coefficient of the equalizer 620 of the reception unit RX1, which is the result of the training, and the identification information of the connected the device equipment 200 and the identification information of the cable 300, are associated with each other, and the correction coefficient and each identification information are stored in the memory unit 180. Similarly, the correction coefficient of each of the equalizer 620 of the reception unit RX2 of the device equipment 200 and the reception units RX3 and RX4 of the cable 300 are stored in the memory unit 180 of the host equipment 100 in association with the identification information.

In normal operation after the training sequence, the reception units RX (RX1, RX2, RX3, RX4) performs a receive operation using the correction coefficient selected by the training sequence.

Each correction coefficient and each identification information stored in the memory unit 180 are read from the memory unit 180 and set in each equalizer 620 of the reception units RX (RX1, RX2, RX3, RX4) when the host equipment 100 is connected to the device equipment 200 and the cable 300 of the same identification information.

Each time the same combinations are connected, the equalizer 620 is set to the previously stored correction coefficient. This means that the beginning of the training sequence is the result that has already been trained. Since the training results are further updated (learned) by the training sequence at this time, the correction coefficient can select values with the Eye opening of the received signals more open. Therefore, as the number of connections increases, the opening is opened to improve the reception characteristics, and as a result, the effective data rate can be increased.

Various combinations of the device equipment 200 and the cable 300 are assumed in the USB-based transceiver system in which insertion/removal and device change are frequently performed. Since the state of the transmission path changes depending on the combination of connections with the host equipment 100, the device equipment 200, and the cable 300, the memory unit 180 stores the correction coefficient of the equalizer 620 in units of the combination of the identification information of the device equipment 200 and the identification information of the cable 300.

The training sequence of the equalizer 620 is also executed for the reception units RX3 and RX4 of the retimer 320 and the reception unit RX2 of the device controller 220 in the same manner as described above. That is, the control unit of the host equipment 100 controls each equalizer 620 of each the reception units RX (RX1, RX2, RX3, RX4) in the same manner as the reception unit RX1 of the host controller 120. This allows each equalizer 620 to improve the reception characteristics by determining the individual correction coefficient for each device with different transmission paths of the host equipment 100, the device equipment 200, and the cable 300.

Figure 4:
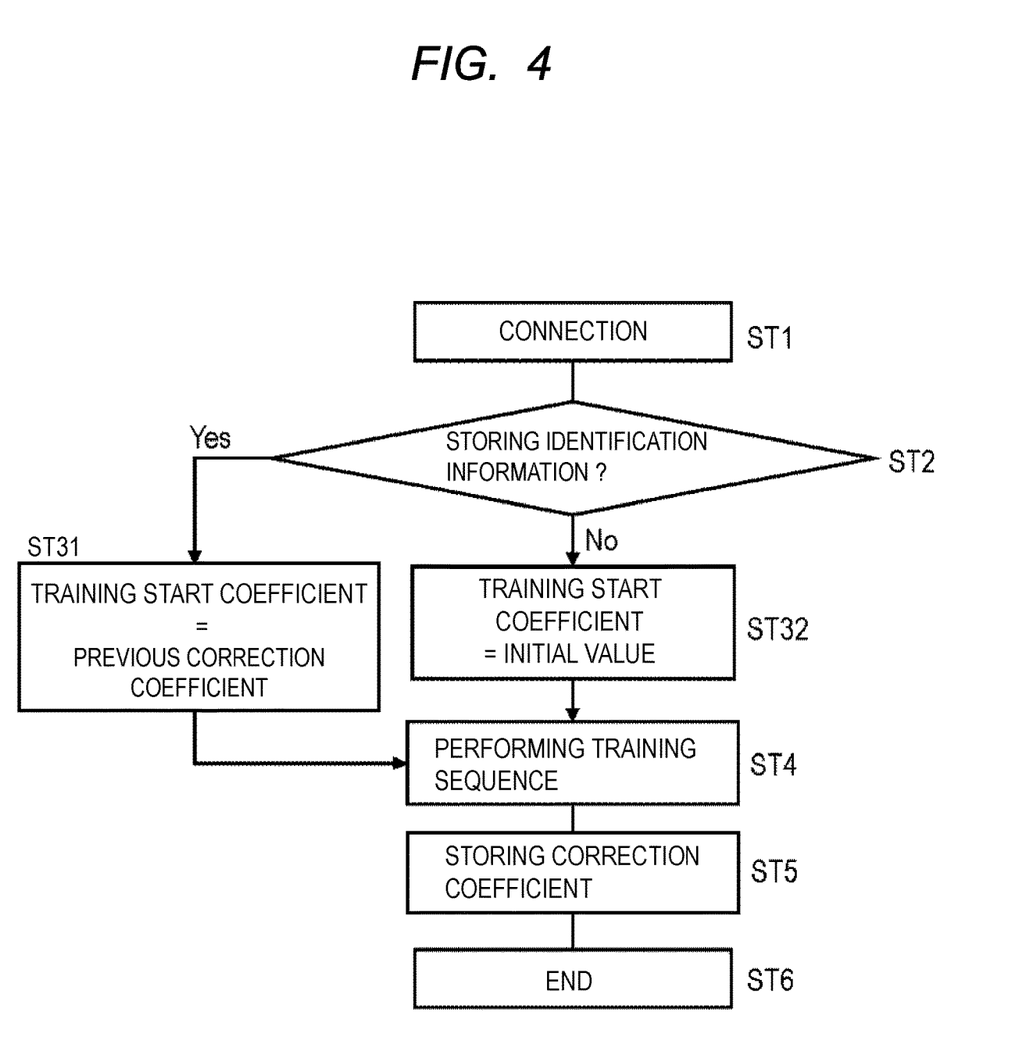
FIG. 4 is a flowchart illustrating an exemplary method of adjusting the received signals of an equalizer including a training sequence in the transceiver system related to the first embodiment.

FIG. 4 is a flowchart illustrating an exemplary method of adjusting the received signals of the equalizer including the training sequence in the transceiver system related to the first embodiment. The steps will be described with reference to the transceiver system shown in FIGS. 1, 2, and 3.

The host equipment 100 and the device equipment 200 are connected by the cable 300 (step ST1). The control circuit 140 receives the identification information stored in the identification information unit 260 of the device equipment 200 connected this time and the identification information stored in the identification information unit 360 of the cable 300. The control circuit 140 searches whether the memory unit 180 stores the identification information of the device equipment 200 and the identification information of the cable 300 connected this time and the correction coefficient associated with each identification information (step ST2).

If the memory unit 180 stores the combination of identification information of the device equipment 200 and the identification information of the cable 300 connected and the previous correction coefficient associated with the identification information, the control circuit 140 sets the correction coefficient stored in the memory unit 180 as a training start coefficient to the each equalizer 620 of the reception units RX (RX1, RX2, RX3, RX4) (step ST31).

If the memory unit 180 does not store the combination of identification information of the device equipment 200 and the identification information of the cable 300 connected, the host controller 120 sets a previously stored the initial value as the training start coefficient in the respective equalizer 620 of the reception units RX (RX1, RX2, RX3, RX4) (step ST32). Using the set values of correction coefficient, the host controller 120 performs the training sequence (step ST4). The host controller 120 repeatedly receives the test signals based on the set correction coefficient, changes the correction coefficient of the equalizer, and receives the test signals.

At the end of the training sequence, the control circuit 140 stores updated correction coefficient of each equalizer 620 of the reception units RX (RX1, RX2, RX3, RX4) in the memory unit 180 in association with the combination of the identification information of the device equipment 200 and identification information of the cable 300 (step ST5). End the training sequence (step ST6). After the training sequence is completed, the operation shifts to the normal operation, and the equalizer 620 of the reception units RX (RX1, RX2, RX3, RX4) performs the reception operation based on the learned result correction coefficient.

The above-described flowchart of the reception signal conditioning method enables the training sequence learning result the correction coefficient to be stored in combination with identification information. When the host equipment 100 is connected to the device equipment 200 and the cable 300 having the same identification information as the stored values from the next time onward, the training sequence can be executed using the previous correction coefficient as the training start coefficient. Therefore, the training sequence is started from values already learned and updated as compared with the first connection, so that the correction coefficient with better reception characteristics can be obtained.

Figure 5:
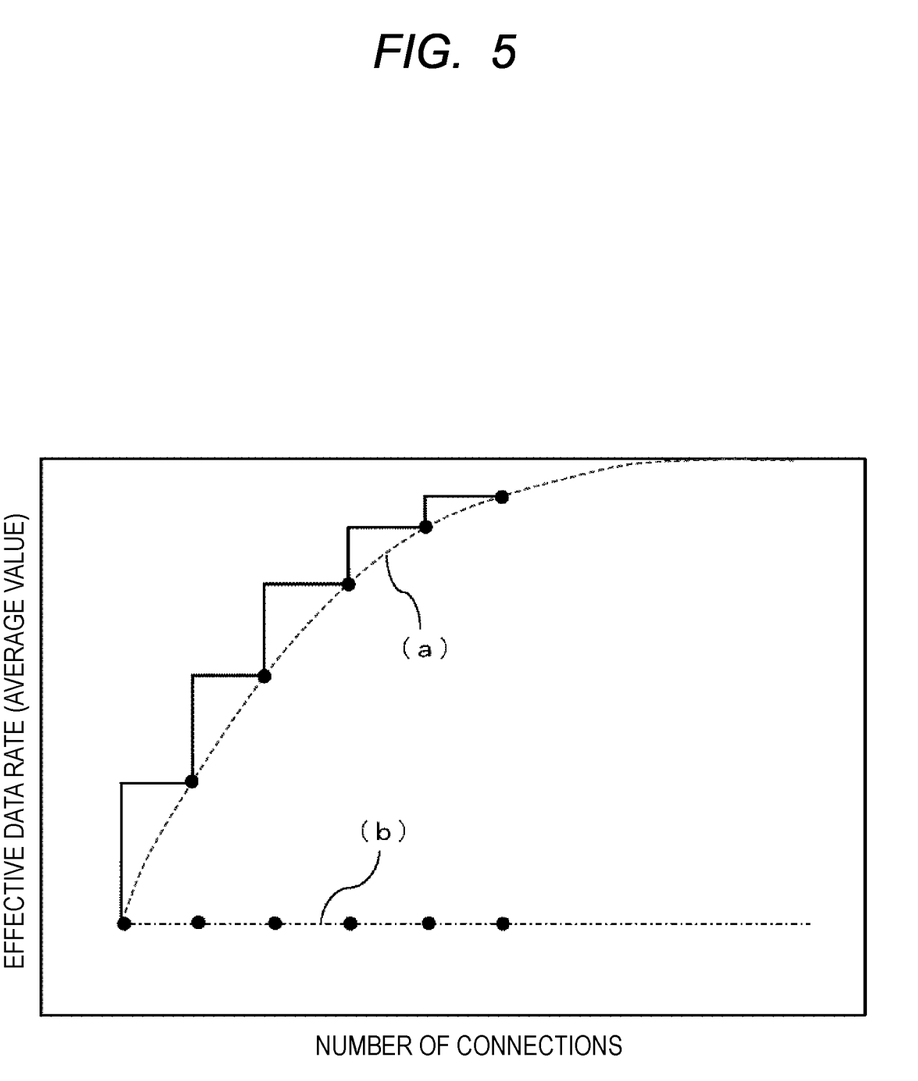
FIG. 5 is a graph illustrating an example of the relationship between number of connections and the effective data rate.

FIG. 5 is a graph illustrating an example of a relationship between the number of connections and the effective data rate. It shows the case of applying first embodiment (a) and the comparative example (b). Comparative Example (b) shows the case where first embodiment is not applied. When first embodiment is applied (a), as the number of connections increases, the data rate is updated to the correction coefficient with good reception characteristics, so that the average value of the effective data rate is gradually increased. In the comparative example (b), even if the number of connections increases, the effective data rate remains constant because the training sequence is executed from a predetermined initial value each time.

The training sequence is performed within a predetermined period of time, e.g., 360 msec, each time a connection is detected. For example, even if the connected devices are the same, if the power supply is shut off while connected and the power supply is provided again, the training sequence is executed again in the transceiver system. When first embodiment is applied, in the transceiver system in which insertion/removal of the same device equipment 200 and the cable 300 frequently occurs or power shutdown frequently occurs, the reception characteristics are improved each time training is performed, and as a result, a higher effective data rate can be obtained.

Next, the effects of the host equipment 100 of the transceiver system of this first embodiment are described below.

In this first embodiment, as described above, the control circuit 140 searches whether the correction coefficient at the time of the previous connection with the same device associated with the identification information combination is stored in the memory unit 180 based on the identification information of the identification information unit 260 included in the device equipment 200 and identification information of the identification information unit 360 included in the cable 300. If the previous correction coefficient is stored in the memory unit 180, each equalizer 620 of the reception units RX (RX1, RX2, RX3, RX4) is set to the previous correction coefficient read from the memory unit 180. As a result, if the connection by the combination of the connected identification information is the second or later connection, the present training sequence is executed from the correction coefficient of the result of the previous training sequence. As a result, since the correction coefficient is further updated to values having good reception characteristics, the effective data rate of data communication can be improved.

Second Embodiment

Figure 6:
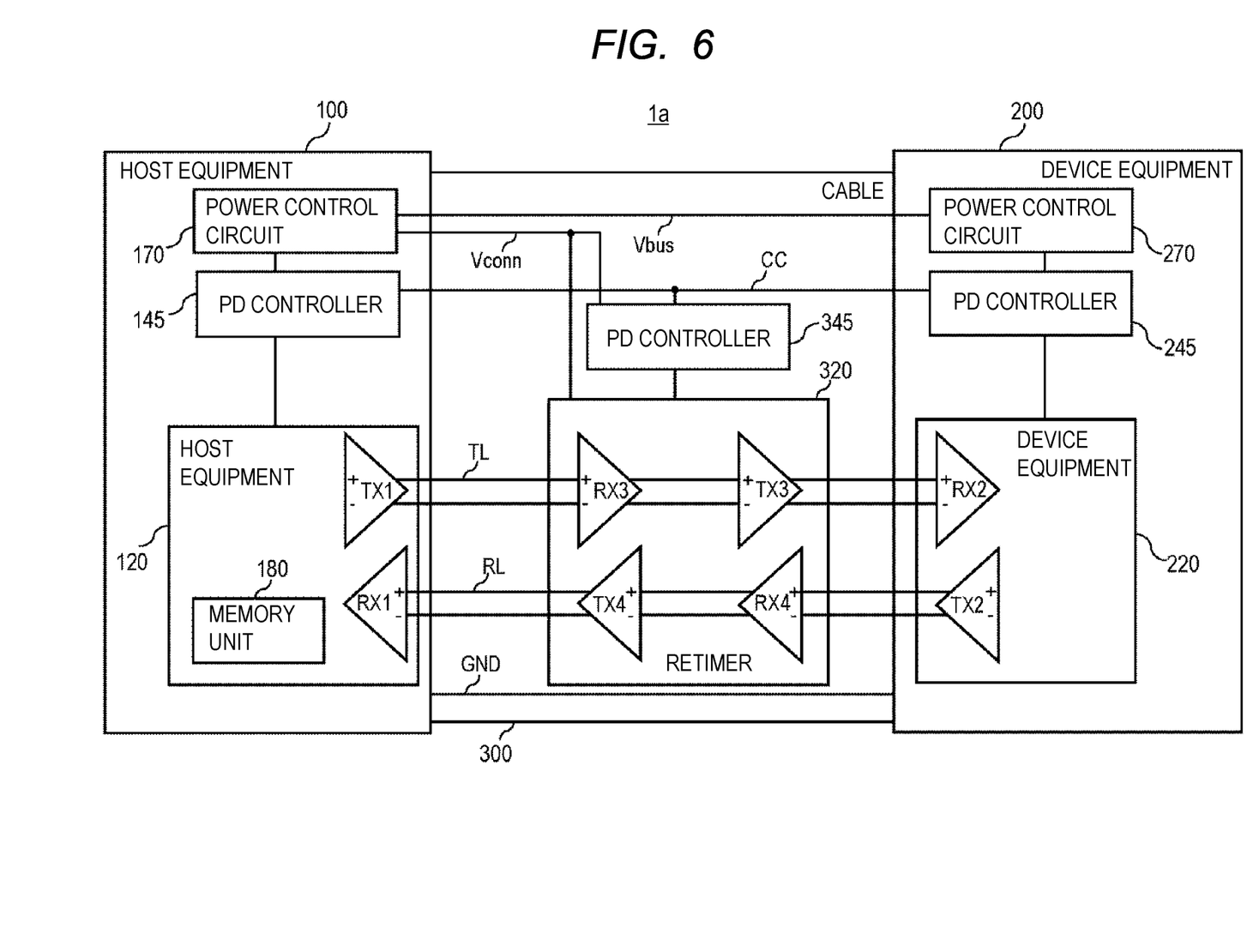
FIG. 6 is a block diagram showing an exemplary internal configuration of the transceiver system related to the second embodiment.

FIG. 6 is a block diagram showing an exemplary configuration of the transceiver system related to the second embodiment. In the following explanation, differences from the first embodiment will be mainly explained.

The transceiver system 1*a* includes the host equipment 100, the device equipment 200, and the cable 300 connected to the host equipment 100 and the device equipment 200.

The host equipment 100 includes the host controller 120, a PD controller 145, and a power control circuit 170. The host equipment 100 controls the entire transceiver system 1*a* including the device equipment 200 and the cable 300. The host equipment 100 is powered by an ac power source. The host equipment 100 is connected to the device equipment 200 and the cable 300 via a ground line GNDs.

The host controller 120 includes the memory unit 180, the reception unit RX1, and the transmission unit TX1.

The PD controller 145 is connected to a PD controller 245 of the device equipment 200 and to a PD controller 345 of the cable 300. The PD controller 145 serves as a control circuit, and acquires the identification information stored in the PD controller 245 of the device equipment 200 and the identification information stored in the PD controller 345 of the cable 300 via a control line (CC line) CC. The PD controller is also referred to as a power delivery controller.

The PD controller 145 controls the host controller 120 to search for the correction coefficient associated with the identification information based on the identification information of the device equipment 200 and the identification information of the cable 300. The PD controller 145 instructs the host controller 120 to control the reception units RX (RX1, RX2, RX3, RX4). Circuit configuration of the reception units RX (RX1, RX2, RX3, RX4), it is possible to utilize the circuit configuration shown in FIG. 3.

In addition, the PD controller 145 performs an authentication process of a USB Type-C Authentication as an authentication initiator. The PD controller 145 process the authentication for the device equipment 200 and the cable 300. The PD controller 145 performs communication such as identification of an individual to be connected and a device authentication for the device equipment 200 and the cable 300, and acquires Hush values of the device equipment 200 and the cable 300, by executing the authentication process. The hush values are also referred to as identification information.

After the device authentication, the PD controller 145 searches whether the identification information of the device equipment 200, the identification information of the cable 300, and the correction coefficient associated with the identification information are stored in the memory unit 180. For the first connection, the correction coefficient is not stored in the memory unit 180. For the second and subsequent connections, the correction coefficient at the time of the previous connection is stored in the memory unit 180. If the correction coefficient was stored in the memory unit 180, the PD controller 145 sets the previous stored correction coefficient to the equalizer 620 of the reception unit RX1 as the starting factor for the training sequence.

The PD controller 145 transmits the previous the correction coefficient read from the memory unit 180 to the PD controller 245 of the device equipment 200 and the PD controller 345 of the cable 300 via the control line (CC line) CC. The PD controller 245 of the device equipment 200 sets the received correction coefficient to the equalizer 620 of the reception unit RX2 of the device controller 220. The PD controller 345 of the cable 300 sets the received correction coefficient to the each of equalizer 620 of the reception units RX3 and RX4 in the retimer 320. The host controller 120 then executes the training sequence.

Upon completion of the training sequence, the PD controller 145 stores the updated correction coefficient of the equalizer 620 of the reception unit RX1 in the memory unit 180 in association with the identification information of the device equipment 200 and the identification information of the cable 300. In addition, the PD controller 145 acquires the updated correction coefficient of the equalizer 620 of the reception unit RX2 of the device equipment 200, the correction coefficient of each of equalizer 620 of the reception units RX3 and RX4 of the cable 300 through the control line (CC line) CC. In addition, the PD controller 145 stores the identification information of the device equipment 200 and the identification information of the cable 300 in association with the correction coefficient of the device equipment 200 and the correction coefficient of cable 300 in the memory unit 180 of the host equipment 100. That is, the PD controller 145 is a control circuit that receives the identification information from the outside by performing the authentication process, searches for the correction coefficient associated with the identification information, and sets the correction coefficient to each equalizer. The PD controller 145 associates the identification information with the correction coefficient. The PD controller 145 also associates the updated correction coefficient with the identification information.

The power control circuit 170 provides power to the device equipment 200 via a power supply line Vbus. In addition, the power control circuit 170 provides power to the cable 300 via a power supply line Vconn. The device equipment 200 and the cable 300 operate by supplied the power from the host equipment 100.

The device equipment 200 includes the PD controller 245, a power control circuit 270, and the device controller 220. The device equipment 200 performs data communication with host equipment 100 under the control of the host equipment 100.

The PD controller 245 is connected to PD controller 145 of the host equipment 100 via the control line (CC line) CC and performs data communication. The PD controller 245 includes the identification information of the device equipment 200. The PD controller 245 transmits the identification information to the host equipment 100 via the control line (CC line) CC. The PD controller 245 controls the equalizer 620 of the reception unit RX2 of the device controller 220.

Similar to the PD controller 145 of the host equipment 100, the PD controller 245 of the device equipment 200 sets the correction coefficient stored in the memory unit 180 to the equalizer 620 of the reception unit RX2 of the device controller 220, and executes the training sequence. The PD controller 245 acquires the correction coefficient from the PD controller 145 of the host equipment 100 via the control line (CC line) CC and sets it to the equalizer 620 of the reception unit RX2. Further, the PD controller 245 performs a function of controlling power supply or power reception in accordance with USB PD, and performs communication such as the identification of each device, the device authentication, and the like.

The power control circuit 270 converts the power supplied through the power supply line Vbus to the power required by the device equipment 200 to provide power to the circuitry in the device equipment 200.

The device controller 220 includes the reception unit RX2 and the transmission unit TX2.

The cable 300 includes the retimer 320, the PD controller 345, the ground line GND, the power supply line Vbus, the power supply line Vconn, the control line (CC line) CC for communication lines, the transmission signal lines TL for communication lines, and the reception signal lines RL for communication lines.

The cable 300 conforms to USB Type-C standard and USB Power Delivery (USB PD) standard. The receptacle 190 of the host equipment 100 and the receptacle 290 of the device equipment 200 each conform to USB Type-C standards. The cable 300 is supplied with power from the host equipment 100 via the power supply line Vconn, and the power is supplied to the PD controller 345 and the retimer 320.

The PD controller 345 is connected to the PD controller 145 of the host equipment 100 and the PD controller 245 of the device equipment 200 via the control line (CC line) CC, and performs data communication. The PD controller 345 includes the identification information of the cable 300. The PD controller 345 outputs the identification information to the host equipment 100 via the control line (CC line) CC. The PD controller 345 controls the retimer 320 and each of equalizer 620 of the reception units RX3 and RX4 of the retimer 320.

Similar to the PD controller 145 of the host equipment 100, the PD controller 345 of the cable 300 sets the correction coefficient stored in the memory unit 180 for each of the equalizer 620 of reception units RX3 and RX4 of the retimer 320, and executes the training sequence. The PD controller 345 acquires the correction coefficient from the PD controller 145 of the host equipment 100 via the control line (CC line) CC and sets it to each equalizer 620 of the reception units RX3 and RX4. Further, the PD controller 345 performs a function of controlling power supply or power reception in accordance with USB PD, and performs communication such as the identification of each device, the device authentication, and the like.

The retimer 320 includes the plurality of reception units RX3, RX4, and the plurality of transmission units TX3, TX4. Inside the retimer 320, the data received by the reception unit RX3 is passed to the transmission unit TX3. The data received by the reception unit RX4 is passed to the transmission unit TX4.

Figure 7:
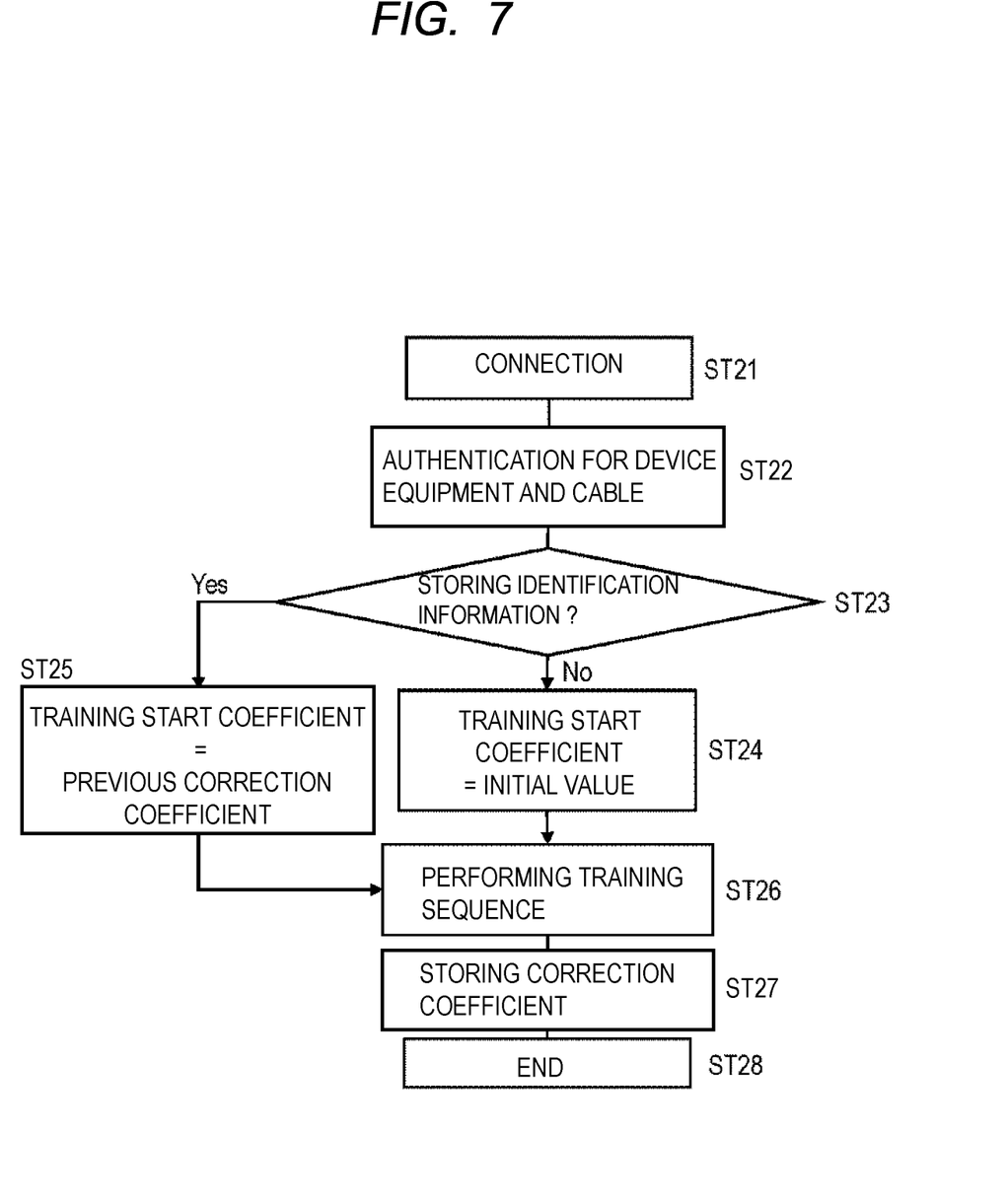
FIG. 7 is a flowchart illustrating an exemplary method of adjusting the received signals of the equalizer including the training sequence in the transceiver system related to the second embodiment.

FIG. 7 is a flowchart illustrating an exemplary method of adjusting the received signals of the equalizer including the training sequence in the transceiver system related to the second embodiment. The steps will be described with reference to the transceiver system 1a shown in FIGS. 1, 3, and 6.

The host equipment 100 and the device equipment 200 are connected by the cable 300 (step ST21). The PD controller 145 of the host equipment 100, when detecting a change in the potential level of the control line (CC line) CC, the power supply line Vbus is turned on, for example, a voltage 5V is supplied to power supply line Vbus. This provides power to the device equipment 200 and causes the device controller 220 to begin operating. The power supply line Vconn is also turned on in the same way, and power is supplied to the cable 300. This causes the PD controller 345 and the retimer 320 of the cable 300 to begin operating.

PD communication is performed, and the PD controller 145 of the host equipment 100 becomes an authentication initiator to perform the device authentication (step ST22). Here, the device authentication is to perform authentication for the device equipment 200 and the cable 300. In addition, various initialization operations are also performed. The PD controller 145 of the host equipment 100 receives the identification information of device 200 and the identification information of the cable 300 via the control line (CC line) CCs.

The PD controller 145 of the host equipment 100 searches whether the memory unit 180 stores the identification information of the device equipment 200 and the identification information of the cable 300 connected this time and the correction coefficient associated with the identification information (step ST23).

If the memory unit 180 stores the combination of the identification information of the device equipment 200 and the identification information of the cable 300 connected and the correction coefficient associated with the identification information above, the PD controller 145 sets the previous correction coefficient stored in memory unit 180 as a training start coefficient to the each equalizer 620 of the reception units RX (RX1, RX2, RX3, RX4) (step ST25). If the memory unit 180 does not store the combination of the identification information of the device equipment 200 and the identification information of the cable 300 connected, the host controller 120 sets a previously stored the initial value as the training start coefficient in the respective equalizer 620 of the reception units RX (RX1, RX2, RX3, RX4) (step ST24). The host controller 120 executes the training sequence based on the set values of correction coefficient (step ST26).

Upon completion of the training sequence, the PD controller 145 stores the correction coefficient of each equalizer 620 of the reception units RX (RX1, RX2, RX3, RX4) in the memory unit 180 in association with the combination of the identification information of the device equipment 200 and the identification information of the cable 300 (step ST27). Thereby, the updated correction coefficient of each equalizer 620 are stored in the memory unit 180. Exit the training sequence (ST28 step). After the training sequence is completed, the operation shifts to the normal operation, and the equalizer 620 of the reception units RX (RX1, RX2, RX3, RX4) performs the reception operation based on the correction coefficient.

According to the flow of the received signal adjusting method described above, the correction coefficient, which is the learned result of the previous training sequence, is stored in the memory unit 180 when the received signal adjusting method is connected for the second time or later. Therefore, the host controller 120 can execute the training sequence from the last correction coefficient stored in the memory unit 180.

Further, the PD controller 145 can store the correction coefficient, which is the result of learning the training sequence, in combination with the identification information. Accordingly, when the host equipment 100 is connected to the device equipment 200 and the cable 300 having the same combination of identification information from the next time onward, the training sequence can be executed using the previous correction coefficient as the training start coefficient. Therefore, the training sequence is started from values of the correction coefficient already learned and updated as compared with the first connection, so that the transceiver system can obtain the correction coefficient with better reception characteristics.

Next, the effects of the host equipment 100 of the transceiver system 1a of this second embodiment will be described below.

In the present second embodiment, as described above, the PD controller 145 of the host equipment 100 searches whether or not the correction coefficient, which is the result of the previous training sequence associated with the identification information, is stored based on the identification information of the device equipment 200 and the identification information of the cable 300 obtained by the device authentication. If the previous correction coefficient is stored, the PD controller 145 sets its correction coefficient to the equalizer 620 in the reception units RX (RX1, RX2, RX3, RX4).

This enables the training sequence of each equalizer 620 of the reception units RX (RX1, RX2, RX3, RX4) to be updated to the correction coefficient with good reception characteristics, since it starts from the already trained correction coefficient at the same device-to-device connections. As a result, it is possible to improve the effective data rate of high-speed data communication.

Although the invention made by the present inventor has been specifically described based on the embodiment, the present invention is not limited to the embodiment described above, and various modifications can be made without departing from the gist thereof. For example, the correction coefficient stored in combination with identification information is not limited to the value of the result of executing the training sequence at the time of the previous connection, but may be the value of the result of the training sequence at the time of the previous connection. The host equipment 100 and the device equipment 200 may be a communication device.

What is claimed is:

1. A communication system communicating with an external device via transmission signal lines and reception signal lines, the communication system comprising:
    a memory unit that stores identification information of the external device and a correction coefficient associated with the identification information;
    an equalizer that operates based on the correction coefficient; and
    a control unit that sets the correction coefficient stored in the memory unit to the equalizer.

2. The communication system according to claim 1, wherein the control unit includes a host controller controlling a transmission and a reception of signals between the external device, and
    wherein the host controller sets a predetermined value to the equalizer as the correction coefficient if the memory unit does not store the correction coefficient associated with the identification information.

3. The communication system according to claim 2, wherein the host controller executes a training sequence for the equalizer,
    wherein, in the training sequence, the host controller receives test signals and changes the correction coefficient to be set to the equalizer, repeatedly, to select the correction coefficient, and
    wherein the correction coefficient selected in the training sequence is associated with identification information of the external device and stored in the memory unit.

4. The communication system according to claim 3, wherein the host controller includes the equalizer,
    wherein the equalizer receives signals from the external device via the reception signal lines,
    wherein the control unit further includes a control circuit setting the correction coefficient stored in the memory unit to the equalizer, and
    wherein the control circuit searches the correction coefficient associated with the identification information of the external device and identification information of a cable including the reception signal lines.

5. A control device comprising a circuit configured to:
    receive identification information from an external device by performing an authentication process;

search a correction coefficient associated with the identification information; and
set the correction coefficient.

6. The control device according to claim 5, wherein the circuit is further configured to associate the correction coefficient and the identification information.

7. The control device according to claim 5, wherein the circuit is further configured to associate an updated correction coefficient and the identification information.

8. A method for an equalizer to adjust received signals, the method comprising:
  searching identification information of an external device coupled to the equalizer and a correction coefficient associated with the identification information;
  setting the correction coefficient associated with the identification information of the external device to the equalizer; and
  selecting a correction coefficient by 1) receiving test signals based on the set correction coefficient, and 2) repeatedly changing the correction coefficient of the equalizer.

9. The equalizer adjusting received signals method according to claim 8, further comprising:
  setting an initial value to the equalizer when no correction coefficient is associated with the identification information of the external device.

10. The equalizer adjusting received signals method according to claim 9, further comprising:
  associating the selected correction coefficient with the identification information of the external device; and
  storing the selected correction coefficient, which is associated with the identification information of the external device, in a memory unit.

* * * * *